United States Patent
Borkenhagen et al.

(10) Patent No.: US 7,392,418 B2
(45) Date of Patent: Jun. 24, 2008

(54) CAPACITY ON DEMAND USING SIGNALING BUS CONTROL

(75) Inventors: John Michael Borkenhagen, Rochester, MN (US); Benjamin F. Carter, III, Georgetown, TX (US); Stephen Roland Levesque, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 11/016,204

(22) Filed: Dec. 17, 2004

(65) Prior Publication Data
US 2006/0136680 A1    Jun. 22, 2006

(51) Int. Cl.
*G06F 1/00* (2006.01)
*G06F 1/04* (2006.01)
*G06F 1/14* (2006.01)

(52) U.S. Cl. .......................... 713/500; 713/502
(58) Field of Classification Search .................. 713/500
See application file for complete search history.

(56) References Cited

U.S. PATENT DOCUMENTS

| | | | | |
|---|---|---|---|---|
| 5,862,353 | A * | 1/1999 | Revilla et al. | 710/107 |
| 6,567,207 | B1 * | 5/2003 | Badr et al. | 359/341.32 |
| 2003/0217153 | A1 * | 11/2003 | Rao et al. | 709/226 |
| 2005/0102398 | A1 * | 5/2005 | Zhang et al. | 709/225 |

OTHER PUBLICATIONS http://www-8.ibm.com/servers/eserver/au/pseries/cuod/advantages.html, "pSeries Capacity Upgrade on Demand advantages".
IBM Patent Application, U.S. Appl. No. 10/616,676, by Daniel C. Birkestrand, et al., filed Jul. 10, 2003, "Apparatus and Method for Providing Metered Capacity of Computer Resources".
IBM Patent Application, U.S. Appl. No. 10/406,164, by Daniel C. Birkestrand, et al., filed Apr. 3, 2003, "Billing Information Authentication for On-Demand Resources".
IBM Patent Application, U.S. Appl. No. 10/640,541, by Daniel C. Birkestrand, et al., filed Aug. 28, 2003, "Capacity On Demand Grace Period for Incompliant System Configuration".
Journal of Parallel and Distributed Computing 61, pp. 609-640 (2001), "Architectural Effects of Symmetric Multiprocessors on TPC-C Commerical Workload", Xing Du, et al.

* cited by examiner

*Primary Examiner*—James K. Trujillo
*Assistant Examiner*—Michael J Brown
(74) *Attorney, Agent, or Firm*—Robert R. Williams

(57) ABSTRACT

An apparatus and method is disclosed for providing capacity on demand using control to alter latency and/or bandwidth on a signaling bus in a computer system. If additional capacity is required, authorization is requested for additional capacity. If authorized, bandwidth of the signaling bus is increased to provide additional capacity in the computing system. Alternatively, upon authorization, latency of data transmissions over the signaling bus is reduced. In another alternative, upon authorization, memory timings are adjusted to speed up memory fetches and stores.

1 Claim, 7 Drawing Sheets

| BUS CYCLE | TRANSMIT DATA ON BUS 2 | |
|---|---|---|
| | BUS RDY 37 | DATA 37A-38N |
| 1 | 1 | DATA-1 |
| 2 | 1 | DATA-2 |
| 3 | 1 | DATA-3 |
| 4 | 1 | DATA-4 |
| 5 | 1 | DATA-5 |
| 6 | 1 | DATA-6 |
| 7 | 1 | DATA-7 |
| 8 | 1 | DATA-8 |

SHIFT REGISTER 35 INITIALIZED TO "11111111"

Fig. 3A

| BUS CYCLE | TRANSMIT DATA ON BUS 2 | |
|---|---|---|
| | BUS RDY 37 | DATA 37A-38N |
| 1 | 1 | DATA-1 |
| 2 | 0 | XXX |
| 3 | 1 | DATA-2 |
| 4 | 1 | DATA-3 |
| 5 | 0 | XXX |
| 6 | 1 | DATA-4 |
| 7 | 1 | DATA-5 |
| 8 | 1 | DATA-6 |
| 9 | 1 | DATA-7 |
| 10 | 0 | XXX |
| 11 | 1 | DATA-8 |

SHIFT REGISTER 35 INITIALIZED TO "10110111"

Fig. 3B

CAPACITY ON DEMAND USING SIGNALING BUS CONTROL

BACKGROUND OF THE INVENTION

1. Field of the Invention

The current invention generally relates to digital logic systems. More specifically, the current invention relates to capacity on demand using control over latency and bandwidth of signal bussing.

2. Description of the Related Art

Computing systems are currently available that provide capacity on demand. Capacity is used to denote a performance characteristic of a computing system. For example, in a commercial workload, ability to handle some number of "transactions per minute" is one measure of capacity. Ability to provide a fast response time to a request is another measurement of capacity. Ability to perform some number of floating point operations per second is a third example of capacity. Demand is the workload being placed on the computing system. A computing system having a large capacity but only seeing a small demand is wasteful and expensive. A computing system having a demand higher than a capacity provides slow response to the user. Demand tends to vary greatly during a day or day of week (e.g., in many cases, during weekends, demand is low on many computing systems).

IBM Corporation of Armonk, N.Y., currently provides capacity on demand (COD), which is sometimes called Capacity Upgrade on Demand (CUoD), for IBM eServer pSeries p650, 670 and 690 computing systems. Reference "pSeries Capacity Upgrade on Demand advantages" viewable at the following URL:

http://www-8.ibm.com/servers/eserver/au/pseries/cuod/advantages.html

This capability allows a customer to accommodate unexpected demands on a computing system installed. For example, pSeries 670 and 690 servers are available in units of four active and four inactive processors with up to 50% of the system in standby. As workload demands require more processing power, unused processors can be activated simply by placing an order to activate the additional processors, sending current system configuration to an authorizing source and receiving over the internet an electronically encrypted activation key which unlocks the desired amount of processors. There is no hardware to ship and install, and no additional contract is required. Memory activation works the same way. CUOD is available in various sizes for the p650, p670 and p690 systems. Activation in 4 GB (Gigabyte) increments is made by ordering an activation key to unlock the desired amount of memory.

Providing CUoD by enabling entire processors limits granularity of capacity upgrades (or reductions). For example, in a computing system having four active processors, the smallest increment in capacity is one processor.

Providing CUoD by adding a processor, in some computing environments, may not provide a proportional increase in capacity. For example, if a computing system is running a numerically intensive program and an improvement in that numerically intensive program is desired, adding a processor will not provide the desired improvement, unless the numerically intensive program is capable of distribution across more than one processor. Adding a large increment of memory may not be of much help in the numerically intensive program, either, since many such programs make extensive use of a relatively small amount of memory, and bandwidth, rather than total memory size, is the dominant consideration.

Additional references include patent applications filed by the current assignee of the present patent application include: Ser. No. 10/616,676, "Apparatus and Method for Providing Metered Capacity of Computer Resources", by Daniel C. Birkestrand et al, filed Jul. 10, 2003; Ser. No. 10/406,164, "Billing Information Authentication for On-Demand Resources", by Daniel C. Birkestrand et al, filed Apr. 03, 2003; and Ser. No. 10/640,541, "Capacity On Demand Grace Period for Incompliant System Configurations", by Daniel C. Birkestrand et al, filed Aug. 28, 2003.

Therefore, there is a need for a method and apparatus to provide a finer granularity of capacity on demand.

SUMMARY OF THE INVENTION

The current invention teaches a structure and method for providing a fine granularity of capacity on demand by providing dynamic control on bandwidth and/or latency on a signal bus in a computing system. Dynamic control means that capacity of a computing system can be increased or decreased respondent to demand. Dynamically controlling bandwidth and/or latency provides arbitrarily fine granularity on COD. In addition, appropriate control can provide more or less capacity on various types of workload. For example, a numerically intensive computing application, as described above, has a throughput determined largely by speed of a single processor and by bandwidth to memory. In contrast, commercial workload tends to have a throughput determined largely by speed of one or more processors, and is very sensitive to latency of memory requests, in particular fetches, of data from memory.

An embodiment of the present invention used in a computing system monitors demand versus a currently authorized capacity of the computing system. When demand differs from capacity by an amount specified by an operator or a designer of the computing system, the computing system makes an encrypted request to an authorizing source. The authorizing source distinguishes the requesting computing system from the request, determines if the computing system is entitled contractually to change the capacity of the computing system and, if so entitled, transmits an encrypted response, usable only in the requesting computing system, to the requesting computing system, authorizing the change in the capacity of the computing system. The computing system, responsive to the authorization, changes a bandwidth and/or a latency in a signaling bus in the computing system.

In an embodiment of the invention, the computing system, responsive to authorization of a request for a change in capacity, changes the bandwidth of the signaling bus by changing a frequency of dead cycles in the signaling bus. No data is transmitted on the signaling bus during a dead cycle.

In another embodiment of the invention, the computing system provides a controlled wait time on a signaling bus, waiting a programmable time interval, such as a number of cycles, on the bus before transmitting data over the signaling bus.

In another embodiment of the invention, the computing system has both a variable latency and a variable bandwidth by changing one or more memory timings, such as, for example, tRRP, the time from the start of one row access to the start of the next row access. There are many possible memory timing values that can be programmed to speed up or delay latency and bandwidth performance for fetches and stores to memory.

In yet another embodiment of the invention, the computing system has a programmable snoop stall. Increasing the programmable snoop stall increases both latency and bandwidth in fetch and store requests.

BRIEF DESCRIPTION OF THE DRAWINGS

FIG. 3A, 3B are tabular descriptions of data transmissions using the processor bus interface of FIG. 2, under two different COD current values.

DETAILED DESCRIPTION OF THE PREFERRED EMBODIMENTS

The invention will be described in detail with reference to the figures. It will be appreciated that this description and these figures are for illustrative purposes only, and are not intended to limit the scope of the invention. In particular, various descriptions and illustrations of the applicability, use, and advantages of the invention are exemplary only, and do not define the scope of the invention. Accordingly, all questions of scope must be resolved only from claims set forth elsewhere in this disclosure.

Capacity of a computing system means how much throughput, or work, the computing system is capable of performing in a given interval of time. There are many measurements and benchmarks for capacity. For example, in a numerically intensive computing system workload, capacity is often measured in floating point operations per second. In a commercial workload, capacity is often measured in how many transactions the computing system can perform in an interval of time. Response times (average and variation) to user requests are often used as a measure of capacity, typically in conjunction with the number of transactions the computing system can perform in an element of time. The present invention contemplates any throughput definition as a measurement of capacity of the computing system. Demand is the workload being placed on the computing system. A computing system having a large capacity but only seeing a small demand is wasteful and expensive. A computing system having a demand higher than a capacity provides slow response to the user. Demand tends to vary during the course of a single day, as well as from day to day, month to month, or even seasonal.

The current invention teaches a structure and method for providing a fine granularity of capacity on demand (COD) by providing control on bandwidth and/or latency on a signal bus in a computing system. Controlling bandwidth and/or latency provides arbitrarily fine granularity on COD. In addition, appropriate control can provide more or less capacity on various types of workload. For example, a numerically intensive computing application, as described above, has a throughput determined largely by speed of a single processor and by bandwidth to memory. In contrast, commercial workload tends to have a throughput determined largely by speed of one or more processors, and is very sensitive to latency of memory requests, in particular fetches of data from memory.

Figure 1:
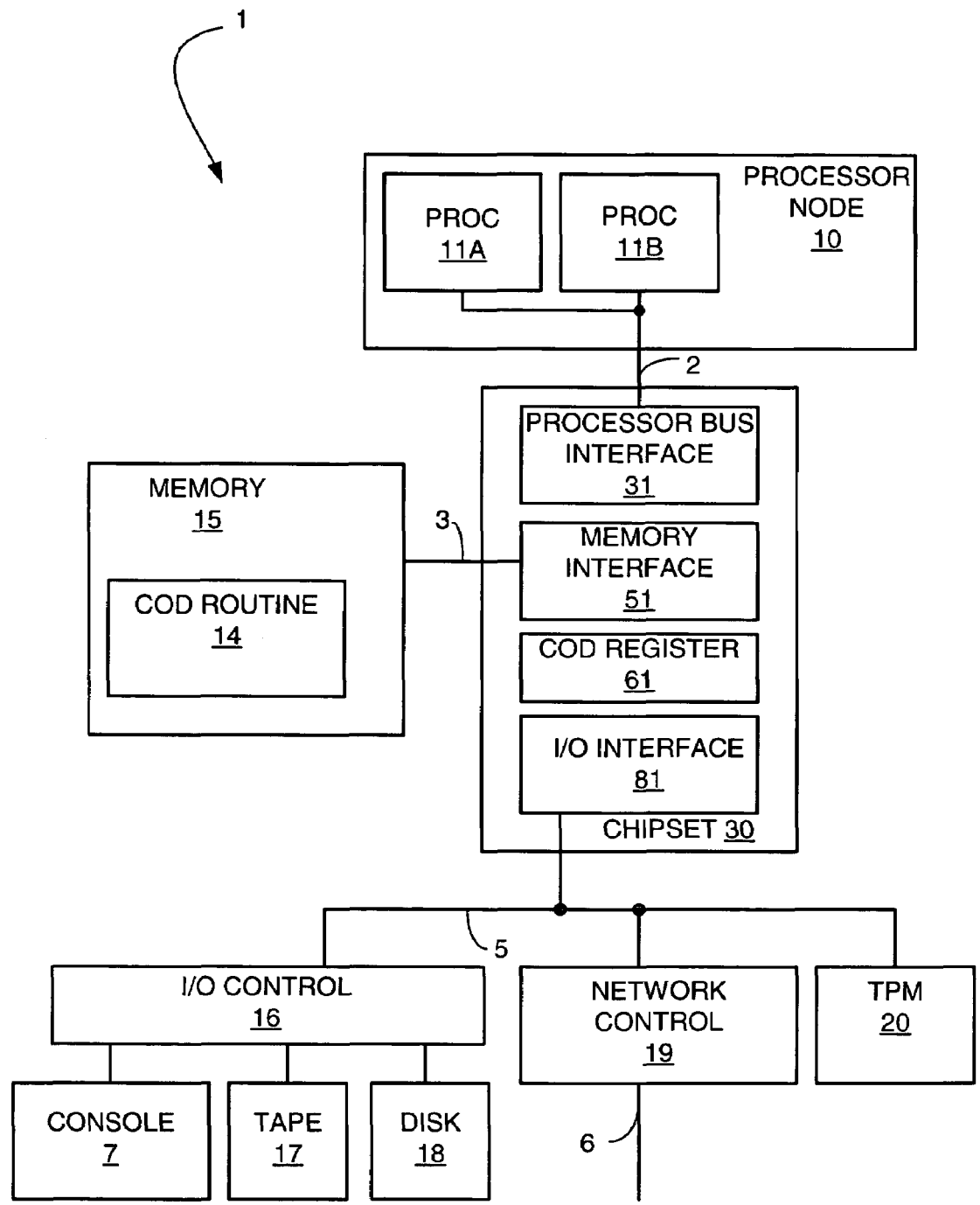
FIG. 1 is a high level block diagram of computing system according to the present invention.

Referring now to FIG. 1, a computing system 1 is shown. A processor node 10 comprises one or more processors 11A, 11B. Any number of processors in a processor node 10 is contemplated. Hereinafter, unless a particular process is to be identified, "processor 11" will be used to denote a processor in general. In addition, although only a single node 10 is shown, any number of nodes is contemplated. Processors 11 are coupled to various functional units in computer system 1 using signaling busses. Several signaling busses will be described shortly. A signaling bus is a group of one or more suitable conductors that are capable of carrying signals from one component in computing system 1 to another component in computing system 1. The conductors may be electrical conductors (e.g. copper conductors, aluminum conductors, and the like), or may be optical conductors, such as fiber optic conductors. It will be understood signaling conductors may carry signals between semiconductor chips in a computing system, or may carry signals from one logical function to a second logical function within the computing system on a single semiconductor chip.

Processor node 10 is coupled by a signaling bus 2 to a chipset 30. Chipset 30 may be implemented with a single chip or a plurality of chips. Chipset 30 comprises a processor bus interface 31; a memory interface 51; a COD (Capacity on Demand) register 61; and an I/O interface 81. Chipset 30 is coupled to a memory 15 by signaling bus 3. Memory 15 is typically implemented with DRAM (Dynamic Random Access Memory) modules, but could be implemented in any storage mechanism. Memory 15 comprises a COD routine 14 that is a program that, when executed in a processor 11, performs the steps of a method embodiment of the invention, the method embodiment to be described in detail later. Chipset 30 is further coupled to I/O devices using signaling bus 5. I/O control 16 couples chipset 30 to a console 7 that provides for operator input and output. I/O control 16 is further coupled to a tape system 17 having one or more magnetic tape drives. I/O control 16 is further coupled to a disk system 18 having one or more magnetic disks. I/O control 16 could also be coupled to other I/O devices such as DVDs, CDROMs, and the like. Chipset 30 is coupled to a network controller 19 which provides access to networks such as local area networks, wide area networks, and the internet over a signaling bus 6. Chipset 30 is also coupled to a trusted platform module (TPM) 20 which provides encryption and for secure communication over network controller 19. An example of a TPM module includes the Atmel® AT97SC3201, a product of Atmel Corporation of San Jose, Calif. It will be understood that signaling busses 2, 3, 5, 6 can be implemented in a wide variety of architectures, including serial transmission techniques, parallel techniques, and including such techniques as incorporation of switches, buffers, and so on. The invention is not limited by any particular type of bus.

It will be understood that, in today's semiconductor technology, processor node 10, chipset 30, memory 15, I/O controller 16, network controller 19, and TPM 20 are typically on separate semiconductor chips. However, future semiconductor technology advances may allow integration of two or more of those functions on a single semiconductor chip. The present invention is equally applicable to such level of integration.

Figure 2:
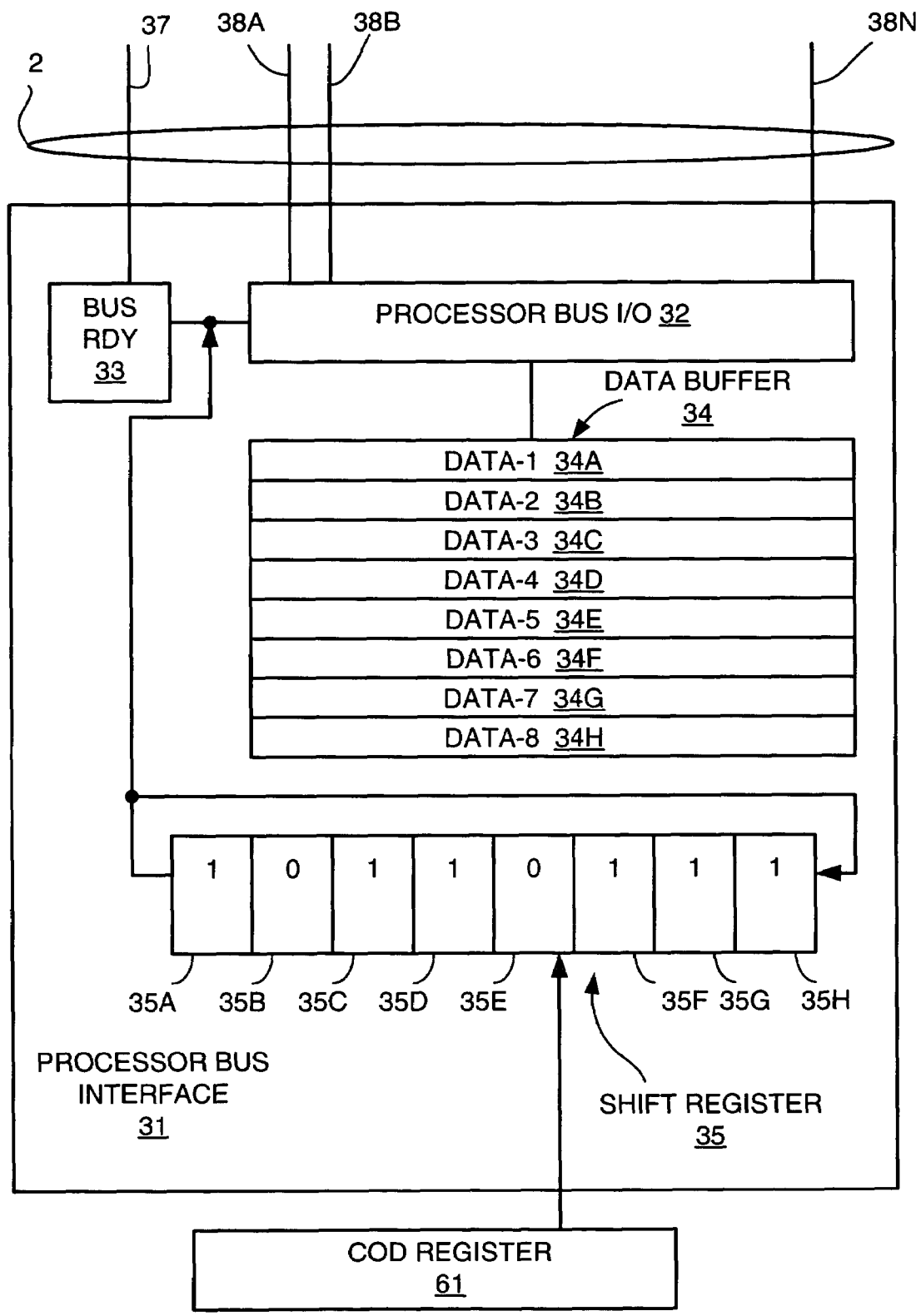
FIG. 2 is a block diagram showing details of a processor bus interface according to an embodiment of the present invention.

FIG. 2 illustrates an embodiment of the invention that provides programmable COD using bandwidth control. When a change in capacity of computing system 1 (FIG. 1) is required, COD routine 14 (FIG. 1) sends an encrypted request to an authorizing source (not shown) through network controller 19 (FIG. 1). TPM 20 (FIG. 1) is used to ensure that the request is secure and that the request is applicable only to a particular computing system 1. If approved, the authorizing source responds with an encrypted authorization through network controller 19. TPM 20 is used to decrypt the encrypted authorization, which is only usable on the particular computing system 1. COD routine 14 then updates COD register 61 to reflect the newly authorized capacity of computing system 1. COD register 61 is coupled to a shift register 35 in processor bus interface 31. FIG. 2 shows an exemplary eight bit shift register 35 having an exemplary bit pattern initialized "10110111" in bits 35A-35H. Shift register 35 shifts left one bit each clock cycle, and the leftmost bit (bit 35A) is coupled to the right end of shift register 35 (bit 35H) so that the bit pattern rotates. Bit 35A is further coupled to a bus ready 33 and processor bus I/O 32. Signaling bus 2 in the present embodiment comprises bus ready signal 37 and data signals 38A-38N. Bus ready 33 drives bus ready signal 37 with a "1" when data signals 38A-38N can be used (e.g., driven or received by processor bus I/O 32. Processors 11 can not drive data on data signals 38A-38N or receive data on data signals 38A-38N unless bus ready 33 is asserted. Bus ready 33 asserts bus ready signal 37 if a current value of bit 35A of shift register 35 is a "1". Bus ready 33 does not assert bus ready signal 37 if a current value of bit 35A of shift register 35 is a "0". A bus cycle when bus ready signal 37 is not asserted is called a dead cycle.

Processor bus I/O 32 receives data from data buffer 34 when processor bus interface 31 drives data to processor 11 over signaling bus 2. Processor bus I/O 32 writes data into data buffer 34 when processor bus interface 31 receives data on signaling bus 2 from processor 11. Data buffer 34 is shown having eight registers 34A-34H, containing data-1 through data-8. Typically a memory fetch (e.g., a cache line) is transmitted from chipset 30 to processor 11 using a number of "beats" (or cycles) on processor bus 2. For example, if, in a particular computing system 1, a cache line has 128 bytes of data, and processor bus 2 can transmit 16 bytes at a time, then eight beats are required to complete the transfer of the cache line, with 16 bytes transmitted on every cycle.

FIG. 3A illustrates how data-1 through data-8 of FIG. 2 are transmitted, when shift register 35 is loaded by COD register 61 with "11111111". During a first bus cycle, bus ready signal 37 is asserted, and data-1 is transmitted. During a second bus cycle, bus ready signal 37 is again asserted, and data-2 is transmitted. Bus ready signal 37 is, in fact, asserted during each of eight bus cycles, and all data from data buffer 34 is transmitted in eight bus cycles.

FIG. 3B illustrates how data-1 through data-8 of FIG. 2 are transmitted when shift register 35 is initialized by COD register 61 with "10110111". During a first bus cycle, bus ready signal 37 is asserted, and data-1 is transmitted. During a second bus cycle, shift register 35 has shifted left and bit 35A contains "0". Bus ready signal 37 is not asserted (i.e., has "0" value). Typically, processor bus I/O 32 continues to drive the same data driven on the previous cycle when bus 37 is not asserted. However, processor bus may be placed in a high impedance state, or may be driven by the next value of data to be driven. In any case, bus ready signal 37 having a "0" value means that processor 11 should not use whatever data is driven during that cycle (i.e., a dead cycle). During a third bus cycle, bus ready signal 37 is again asserted (e.g., using the "1" bit originally initialized into bit 35C, which, after two cycles is in bit 35A) and data-2 is driven on bus 2. As seen in FIG. 3B, transmission of data in data buffer 34 (FIG. 2) takes 11 bus cycles when shift register 35 is initialized with "10110111". A 37.5% degradation in bandwidth on signaling bus 2 has been accomplished using an eight bit implementation of shift register 35 and an initial value of shift register 35 of "10110111". Initialization of shift register 35 having more "0" bits will further reduce the bandwidth of signaling bus 2. Initialization of shift register 35 with fewer "0" bits will similarly increase the bandwidth of signaling bus 2. Shift register 35, although shown for exemplary purposes, has eight bits, but any number of bits in shift register 35 is contemplated. For example, an implementation of shift register 35 having 100 bits allows a very fine granularity control of bandwidth on signaling bus 2. The 100 bit implementation of shift register 35, used with a 100 register implementation of data buffer 34 (or multiple data queues 34), provides approximately a 1% bandwidth granularity on signaling bus 2. While the above examples describe transmission of data from chipset 30 to processor 11, it will be understood that bus ready signal 37 applies equally to transmission of data from processor 11 to chipset 30. That is, processor 11 knows that if bus ready signal 37 is not asserted, chipset 30 will not accept data transmitted.

Figure 4:
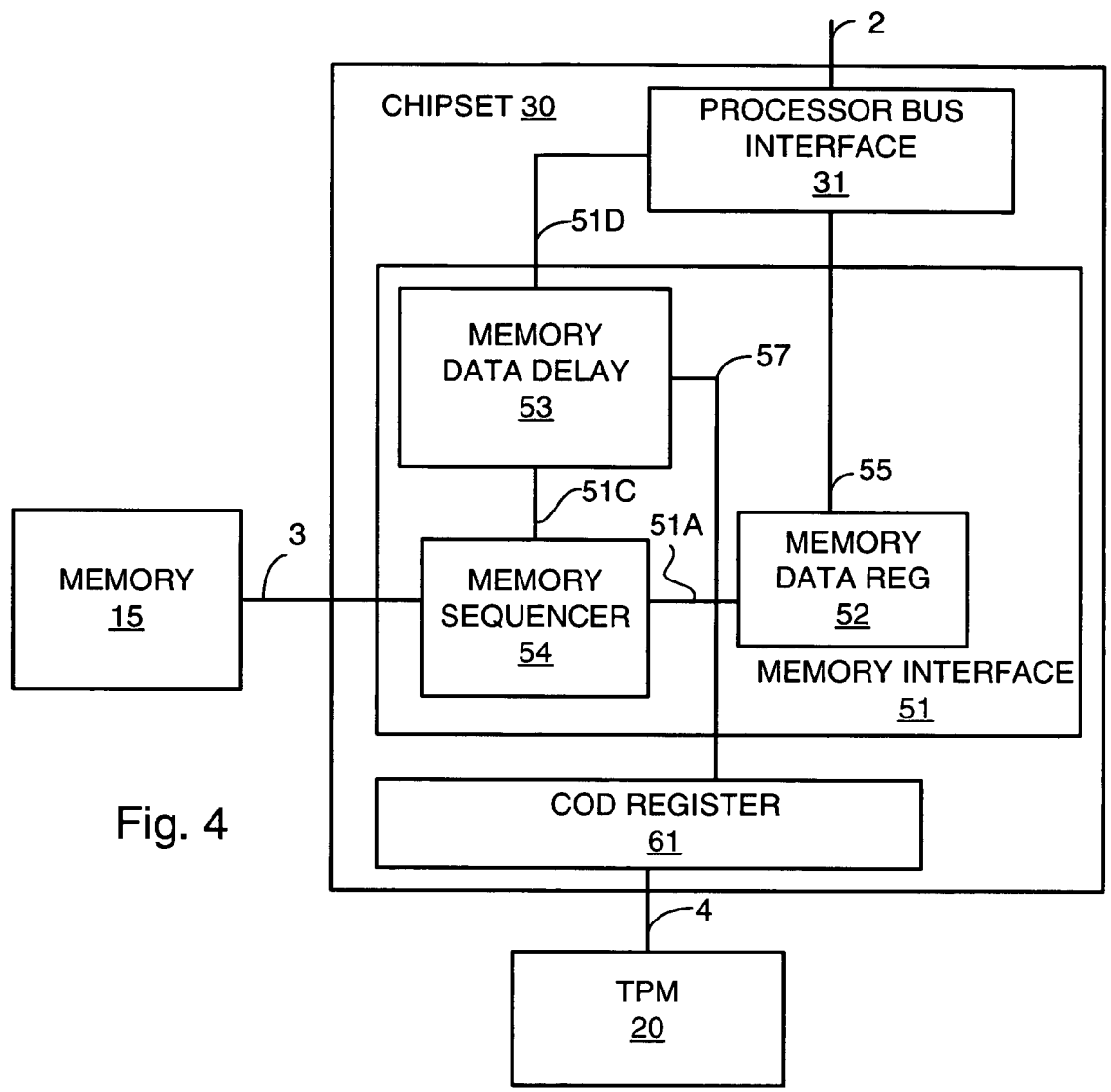
FIG. 4 is a block diagram showing details of the memory interface of FIG. 2.

Referring now to FIG. 4, an embodiment of memory interface 51 is shown in block diagram form. Chipset 30 is shown coupled to signaling bus 2, signaling bus 3, and signaling bus 4, as described earlier. COD register 61, as before, contains the currently authorized capacity of computing system 1, having received the currently authorized capacity using the procedure described earlier, using TPM 20 to encrypt a request and to decrypt the response. A request for data is transmitted over processor signaling bus 2 from processor 11 (FIG. 1). Processor bus interface 31 receives the request and places it in memory data register 52, using signaling bus 55. Memory sequencer 54 receives the request for data and uses memory signaling bus 3 to get the data requested from memory 15. Memory sequencer 15 stores the data requested into memory data register 52. Processor bus interface 31 does not transmit the requested data over processor signaling bus 2 until memory sequencer 54 notifies processor bus 31 that the requested data is in memory data register 52 and is ready for transmission. COD register 61 is coupled to a memory data delay 53 by signaling bus 57. A wait interval is sent from COD register 61 to memory data delay 53. If the currently authorized capacity is set to a maximum value, memory data delay 53 immediately forwards a signal placed on signal 51C by memory sequencer 54 to processor bus interface 31, notifying processor bus interface 31 that data in memory data register 52 is ready for transmission. That is, when data is ready in memory data register 52, processor bus interface 31 transmits it on processor signaling bus 2 immediately. However, if the current capacity authorization is not set at maximum, COD register 61 loads a delay value into memory data delay 53 that will delay a signal on signal 51C by the delay value.

Memory data delay 53, in various embodiments, is a counter, a shift register, or any other programmable delay mechanism. For example, if a delay of twenty cycles is the currently authorized capacity, any signal on signal 51C will be delayed by twenty cycles before being forwarded on signal 51D to processor bus interface 31. Using this technique, twenty (in the example) cycles are inserted in every memory fetch. This technique allows for granularity of one cycle increments in fetch latency. Memory data delay 53 can be programmed to delay a signal on signal 51C by one, two, three, four, or more cycles, limited only by the implementation of memory data delay 53. For example, a programmable 32 bit shift register would support anything from a zero cycle delay to a 31 cycle delay. Commercial workloads are particularly sensitive to variations in fetch latency, and throughput capacity can be tuned on demand using the embodiment of the invention. "Architectural Effects of Symmetric Multiprocessors on TPC-C Commercial Workload" by Du, et al, describe latency effects on commercial throughput on page 630 in the discussion relevant to table 11. The reference is "Journal of Parallel and Distributed Computing" 61, 609-640 (2001).

Figure 5:
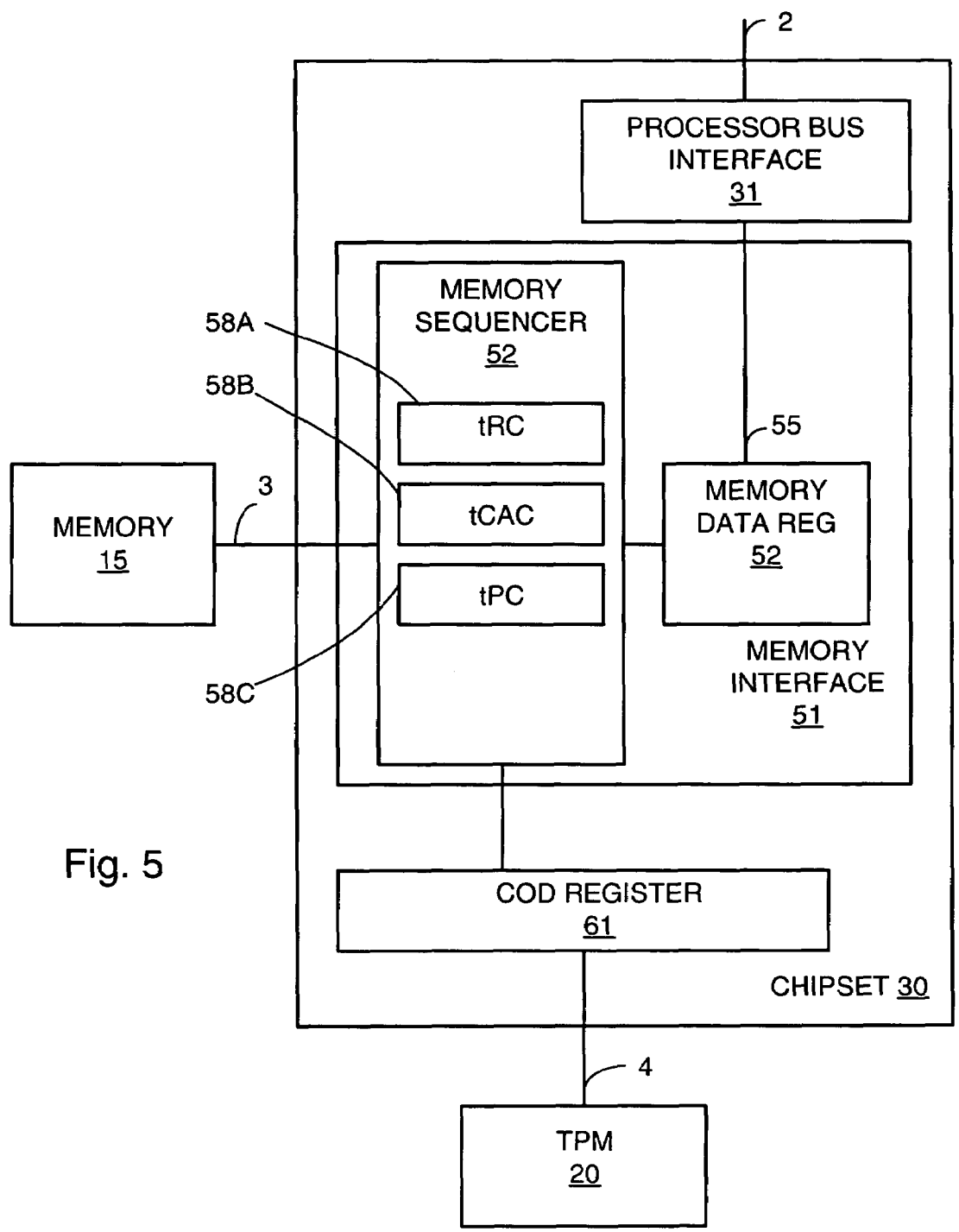
FIG. 5 is a block diagram showing details of a second embodiment of the memory interface of FIG. 2.

FIG. 5 shows another embodiment of the invention suitable for programming an amount of memory latency. COD register 61 contains the value of the currently authorized capacity of the computing system, as described earlier. Memory sequencer 52 contains one or more registers used to determine memory timings. In general, memory sequencers must comply with a large number of memory timings, but, in most cases, can use timing values slower than minimums required by the memory manufacturers. Illustrated for exemplary purposes is tRRD (minimum time from the start of one row access to the start of the next). The current value of tRRD is held in register 58A, and is set from the currently authorized capacity as determined by the value of COD register 61. Similarly, register 58B holds a value of tCL (minimum time from CAS (column address select) line falling to valid data output); register 58C holds a value of tRP (minimum time from RAS rising to RAS falling). rRRD, tCL, and tRP are only a few of the possible memory timings that can be set using the value of COD register 61. The present invention contemplates any memory timing requirement of any memory 15 as usable in embodiments of the invention. In the example shown in FIG. 5, increasing tRRD, tCL, and tRP will increase latency time of memory accesses, which, as described above, will reduce performance of computing system 1.

Figure 6A:
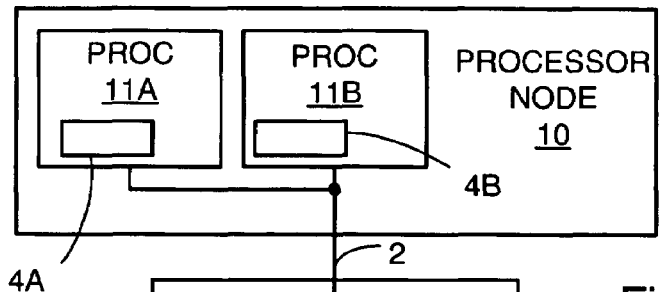
FIG. 6A, 6B, 6C illustrate an embodiment of the invention using programmability of a snoop stall.
Figure 6A:
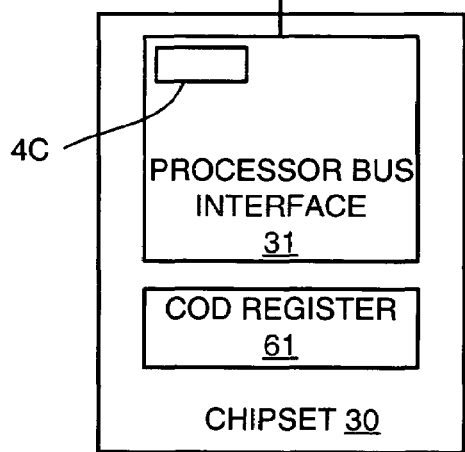
Figure 6B:
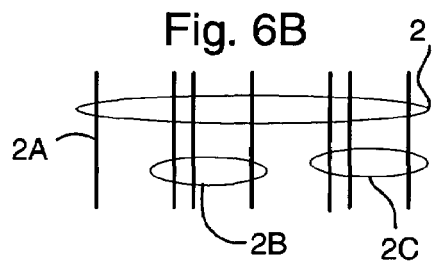
Figure 6C:
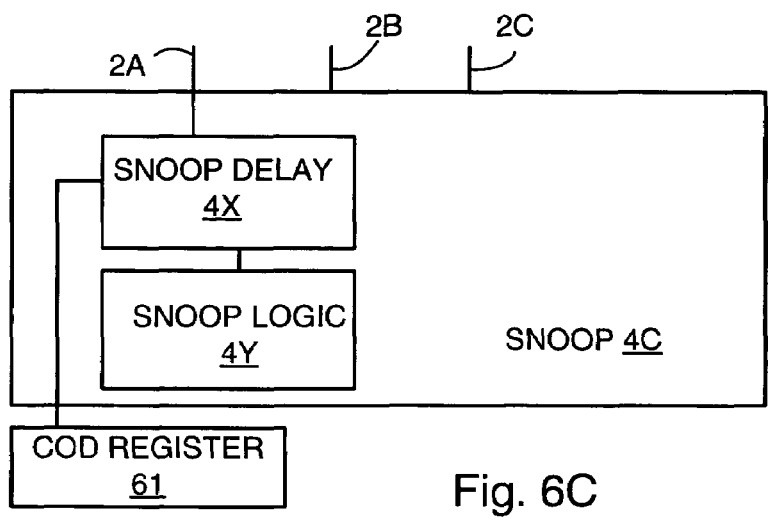

FIG. 6A, 6B, 6C illustrate yet another embodiment of the invention. When a processor 11 (e.g., processor 11A, 11B in FIG. 6A) makes a memory request, many implementations of computer system 1 maintain cache coherency by using a snoop mechanism. A computing system 1 having a snoop mechanism has a processor signaling bus 2 comprising one or more snoop response signals 2A, an address portion 2B, and a data portion 2C as seen in FIG. 6B. A snoop mechanism in a processor 11 or a chipset 30 watches memory requests on address signals 2B in FIG. 2B and checks to see if that processor or chipset has the memory referenced in the memory request. When a memory request is made by processor, other processors and chipset 30 use signals 2A to report having the memory referenced in the memory request. A particular processor 11 or chipset 30 is expected to report on snoop response signal 2A within a predefined time period specified by a designer of the computer system; however, if it is unable to do so in that predefined time period, it can signal a "snoop stall", meaning that it has not yet determined whether it has a copy of the referenced memory. A snoop mechanism is designed as a part of processor 11A (snoop mechanism 4A), processor 11B (snoop mechanism 4B) and chipset 30 (snoop mechanism 4C). As shown in FIG. 6C, snoop mechanism 4C comprises a snoop logic 4Y which determines if chipset 30 contains the requested memory. Snoop mechanism 4C also contains a snoop delay 4X which is coupled to COD register 61. Snoop delay 4X is designed to be capable of delaying a snoop response generated by snoop logic 4Y by an amount determined by the current value of COD register 61. By increasing the delay of snoop delay 4X, memory access latency is increased. For example, if the snoop response generated by snoop logic 4Y is delayed 100 cycles by snoop delay 4X, all memory requests will be delayed by 100 cycles.

Figure 7:
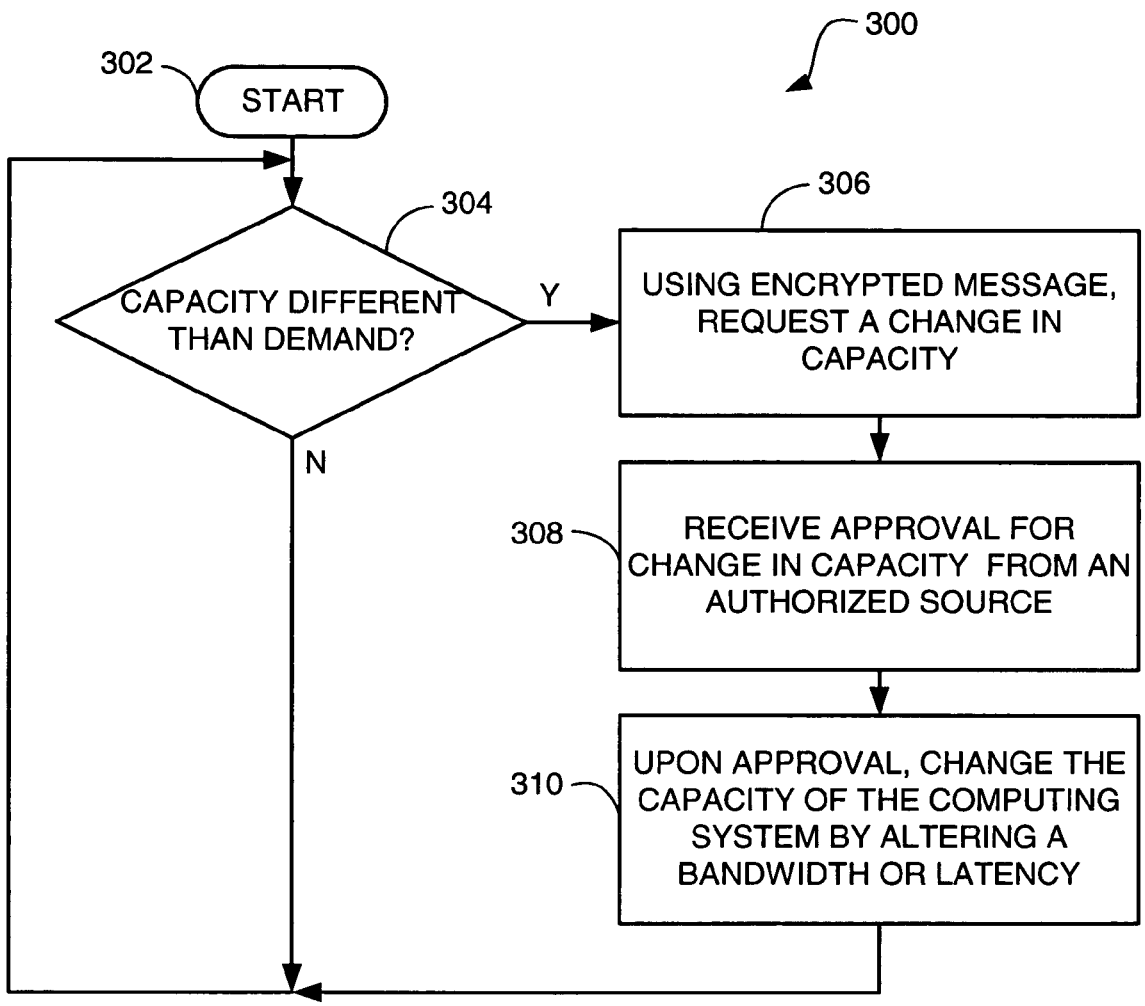
FIG. 7 is a flow chart of a method embodiment of the invention.

A method embodiment of the invention is shown in FIG. 7. Method 300 is a computer executable series of steps loaded into memory 15 (FIG. 1) as COD routine 14. It will be understood that method 300 is capable of being distributed on computer readable media such as, but not limited to, DVD media, CDROM media, magnetic disks, magnetic tapes. Method 300 is also capable of being distributed over networks such as, but not limited to, local area networks, wide area networks, or the internet.

Step 302 begins method 300. Step 304 monitors one or more indicators that relate capacity to demand. Step 304 provides a "yes" answer and transfers control to step 306 if capacity differs by some predetermined amount from demand. For example, a designer of a computing system 1 (FIG. 1) specifies that an average response time to a user transaction should be one second. If computing system 1 finds that, over a prespecified interval determined by the designer of the computing system (or, alternatively, the operator of the computing system), average response time to user transactions exceed one second, step 304 would transfer control to step 306. Similarly, if capacity exceeds demand by an amount specified by the system designer, the user will be paying for more capacity than needed. For example, if the designer specifies that capacity should be reduced if average response times are less than 0.5 seconds, step 304 will pass control to step 306 to begin a series of steps that will reduce capacity of computing system 1. If capacity is within bounds determined by the designer, step 304 simply continues to monitor capacity versus demand on the computer system. Modern computing systems monitor capacity in many ways, measuring signaling bus utilization, processor utilization, response time, number of transactions per interval of time, floating point operations per interval of time, throughput, and so on. In addition, the invention contemplates operator monitoring of capacity. For example, an operator often notices when response time becomes excessive as workload increases.

Step 306 generates an encrypted message requesting an increase or a decrease in capacity. The amount of increase or decrease in capacity can be determined manually by an operator, or generated automatically, such as by using tables or equations programmed in a capacity on demand program, such as COD routine 14 shown in FIG. 1. Advantageously, a TPM (trusted platform module) is used to produce a securely encrypted message that uniquely identifies the particular computing system and the amount of capacity to be increased or decreased.

In step 308, an authorizing source receives the encrypted message from the computing system, uses the unique identifier contained in the encrypted message, determines whether the computing system making the request is entitled to the change in capacity, and produces an encrypted approval for the change, if the computing system is so entitled. The authorizing source keeps track of the currently authorized capacities and the duration of those currently authorized capacities for billing purposes.

In step 310, the computing system receives the encrypted message from the authorizing source, decrypts it, using the TPM, and changes the capacity of the computing system by altering a bandwidth of a signaling bus, by altering a latency of a signaling bus, or by altering both a bandwidth of a signaling bus and by altering a latency of a signaling bus.

Embodiments of the present invention may also be delivered as part of a service engagement with a client company, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendation, integrating the software into existing processes and infrastructure, metering use of the methods and systems described herein, allocating expenses to users, and billing users for the use of these methods and systems.

What is claimed is:

1. A method of providing capacity on demand for a computer system comprising the steps of:
    monitoring an indicator that relates capacity and demand;
    if capacity and demand differ by a predetermined amount, requesting a change in capacity from an authorizing source;
    receiving approval from the authorizing source for a change in capacity; and
    upon approval by the authorizing source, changing the capacity of the computing system by changing a bandwidth or a latency of a signaling bus, the step of changing the capacity of the computing system by changing the bandwidth or the latency of a signaling bus including the step of changing a snoop stall.

* * * * *